(12) United States Patent  
Sasaki

(10) Patent No.: US 6,967,660 B2  
(45) Date of Patent: Nov. 22, 2005

(54) IMAGE PROCESSING APPARATUS AND IMAGE PROCESSING SYSTEM

(75) Inventor: Gen Sasaki, Osaka (JP)

(73) Assignee: Mega Chips Corporation, Osaka (JP)

( * ) Notice: Subject to any disclaimer, the term of this patent is extended or adjusted under 35 U.S.C. 154(b) by 287 days.

(21) Appl. No.: 10/163,578

(22) Filed: Jun. 7, 2002

(65) Prior Publication Data

US 2002/0186223 A1 Dec. 12, 2002

(30) Foreign Application Priority Data

Jun. 11, 2001 (JP) .................................... 2001-175679

(51) Int. Cl.$^7$ ............................................. G06F 13/14
(52) U.S. Cl. ....................... 345/519; 345/77; 345/589
(58) Field of Search .......................... 345/690, 20, 519, 345/589, 601, 77; 348/671–674; 382/167–169; 358/519, 521, 522

(56) References Cited

U.S. PATENT DOCUMENTS 4,931,864 A * 6/1990 Kawamura et al. ......... 358/519
6,046,827 A * 4/2000 Ogoshi et al. .............. 358/487

* cited by examiner

Primary Examiner—Matthew C. Bella  
Assistant Examiner—Hau Nguyen  
(74) Attorney, Agent, or Firm—Oblon, Spivak, McClelland, Maier & Neustadt, P.C.

(57) ABSTRACT

To enable a brightness histogram operation without requiring a special-purpose integration circuit and memory.

An image processing apparatus is provided with a gamma correction processing part. The gamma correction processing part 6 includes a LUT operation circuit 10 having a LUT memory 11 for gamma correction, a simplified gamma correction circuit 12, selectors 14 and 15, and a register 13. When the gamma correction processing part 6 is used exclusively for gamma correction, the CPU 3 makes the register 13 hold aw control signal of L level to thereby cause the selectors 14 and 15 to select "0" terminals. The LUT memory 11 selects and outputs a gamma correction value (LUT conversion value) while referring to input pixel data as address data. On the other hand, when the gamma correction processing part 6 is used for brightness histogram operation, the CPU 3 makes the register 13 hold a control signal of H level to thereby cause the selectors 14 and 15 to select "1" terminals. The LUT memory 11 is used as a memory for storing an accumulation value of the brightness histogram operation.

16 Claims, 4 Drawing Sheets

F I G . 1
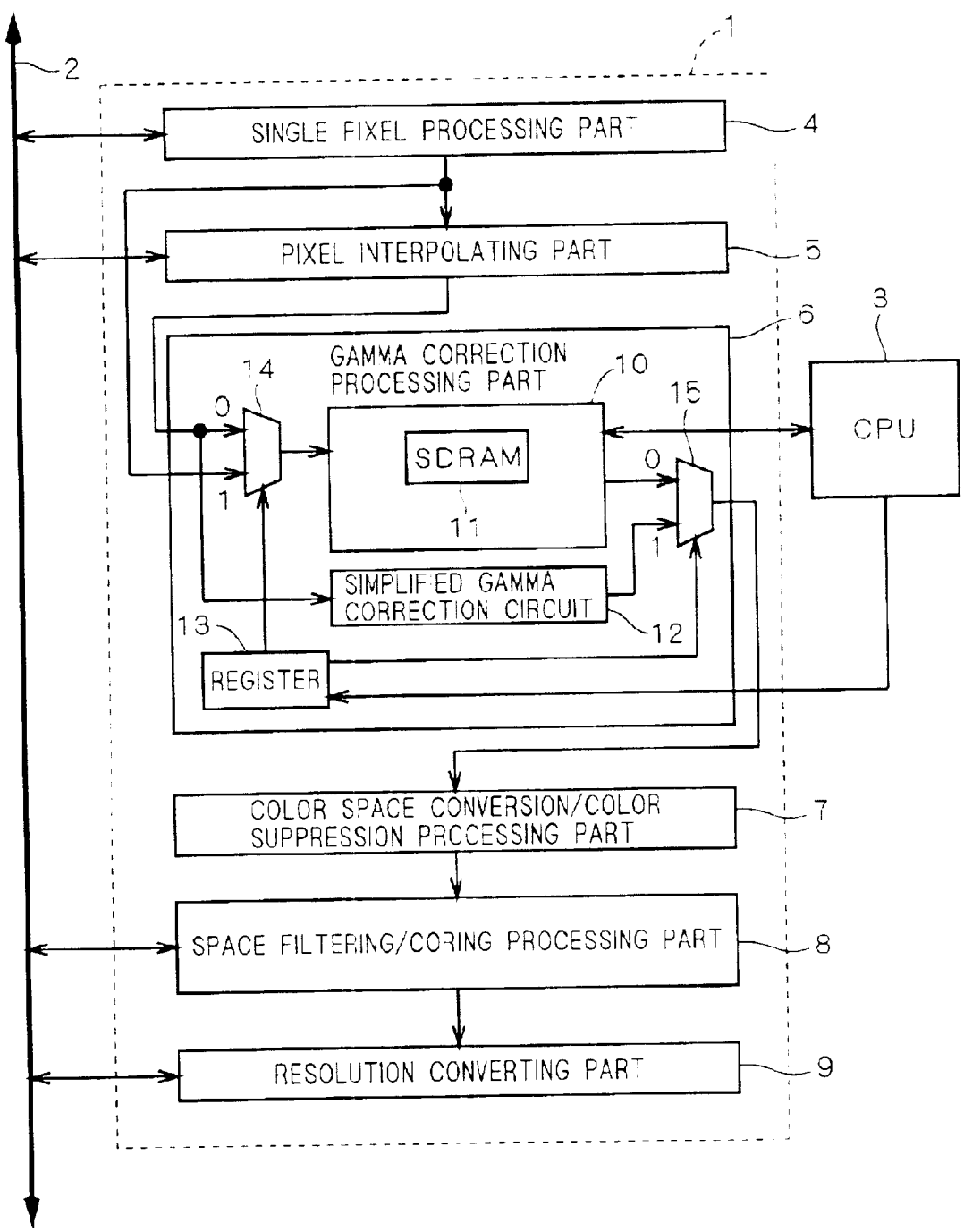

F I G . 2
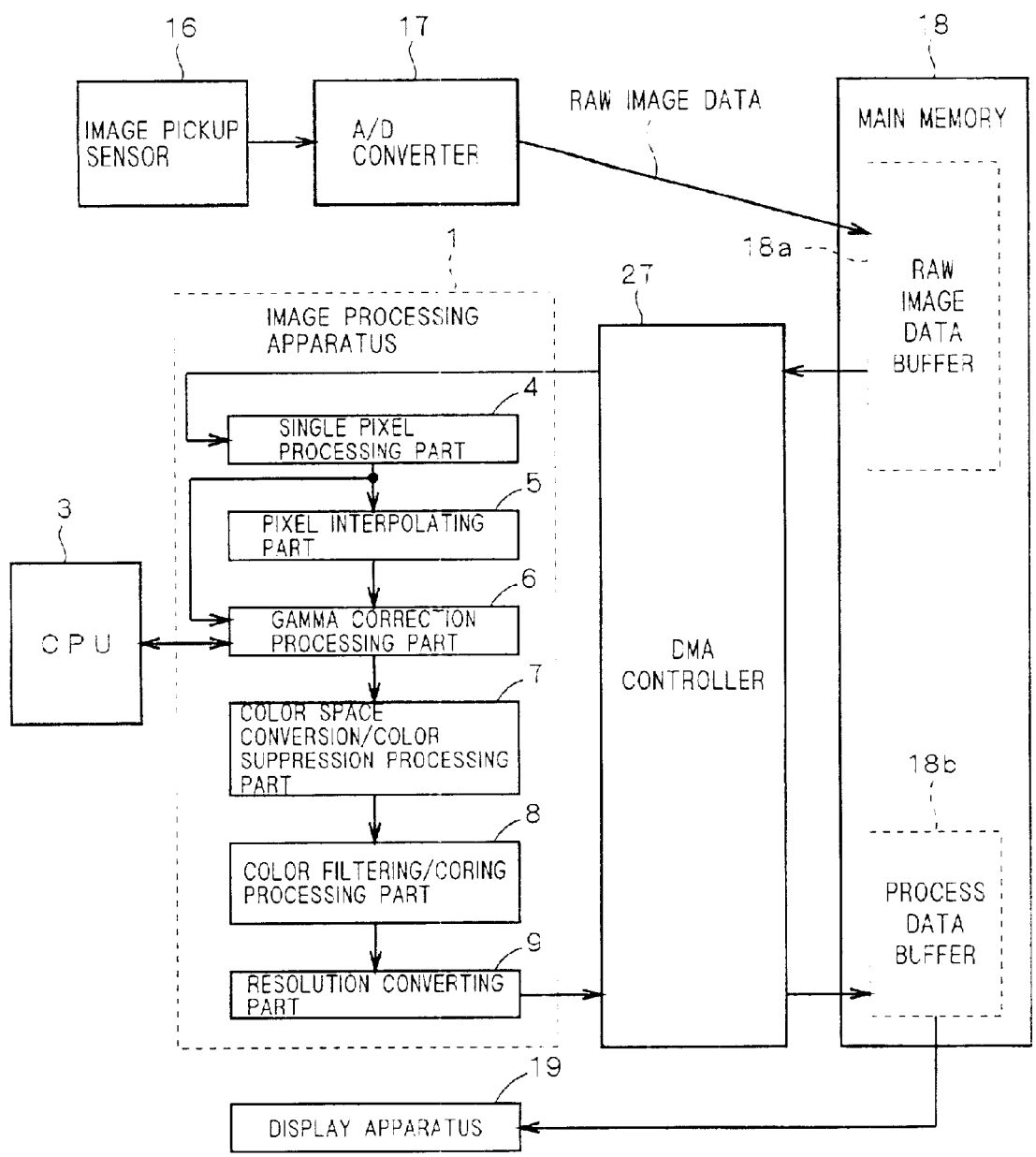

F I G . 4
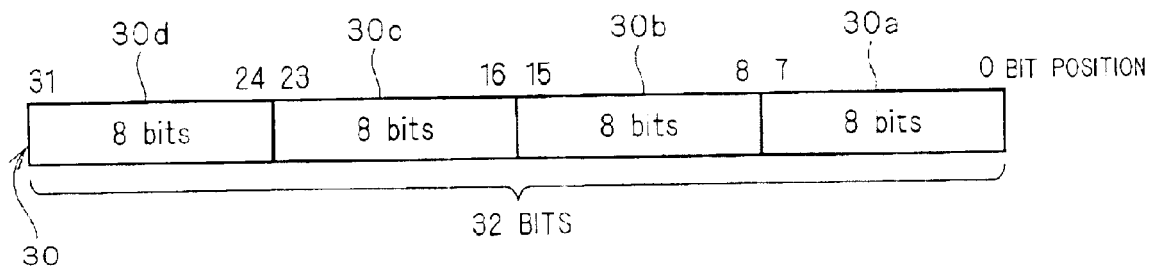
F I G . 5
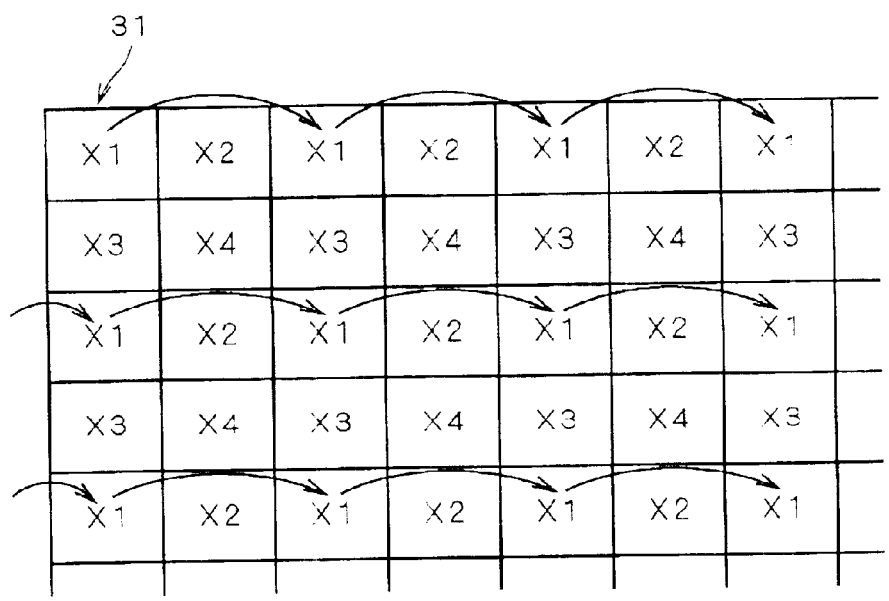

IMAGE PROCESSING APPARATUS AND IMAGE PROCESSING SYSTEM

BACKGROUND OF THE INVENTION

1. Field of the Invention

The present invention relates to an image processing apparatus which calculates a brightness histogram of image data.

2. Description of the Background Art

Conventional image pickup devices such as digital still camera and digital video camera have been equipped with an image processing circuit for performing a variety of digital processes such as pixel interpolation, gamma correction, color space conversion and color suppression after A/D converting captured image data. Such kind of image processing circuit is often mounted on an image pickup device in the form of a chip (integrated circuit) for reducing the apparatus size, reducing the price, as well as for reducing power consumption. Furthermore, for improving the image quality, most of image pickup devices have a function of calculating a brightness histogram indicating the frequency count of brightness value in captured image data and performing, for example, brightness adjustment of e.g. white balance, filtering process, and image processing of the image data on the basis of the brightness histogram thus calculated. Brightness histogram operation can be executed by software processing of CPU mounted on the image pickup device, however, from the view point of executing the operation in short time and reducing the process load and power consumption of the CPU, it is general for an image pickup device to be equipped with a special-purpose integration circuit for executing brightness histogram operation apart from an image processing circuit that performs pixel interpolation and gamma correction, for example.

However, in association with that image pickup devices handle image data of higher tone, the image size of that image data and the bit length of pixel data significantly increase, and hence the number of registers and memory capacity to be mounted on the integration circuit for brightness histogram operation also increase, which posed the problems of increase of power consumption, expansion of packing area, and increase of production cost. For example, in the case of executing brightness histogram operation with respect to image data of 480×640 pixel size and 8-bit tone, the required number of registers to be mounted on the above integration circuit is $2^8$, namely 256 at the maximum, and since the number of times of the brightness value has the potential of becoming 307,200 (=480×640) times at the maximum, it is necessary to prepare a storage area of 19-bit length. Furthermore, in the case of executing brightness histogram operation with respect to image data that has an image size of 2 mega (=2×1024$^2$) and 12-bit tone, the maximum of $2^{12}$, namely 4096 registers to be mounted on the above integration circuit are required, and the number of times of brightness value has the potential of becoming 2,097,152 (=2 mega), so that a memory device of as much as 21-bit length is required.

SUMMARY OF THE INVENTION

According to a first aspect of the present invention, an image processing apparatus for executing a brightness histogram operation and a gamma correction process for input image data, comprises: a lookup-table memory, for receiving pixel data of the image data as address data, and outputting storage data designated by the address data as a gamma conversion value corresponding to a brightness value of the pixel data, during a period of the gamma correction process; an incremental circuit for outputting to the lookup-table memory an accumulation value which is obtained by incrementing an output value from the lookup-table memory, whenever the pixel data is inputted to the lookup-table memory, during a period of the brightness histogram operation; and a controller for controlling so that the output value stored in a storage area of the lookup-table memory is rewritten by the accumulation value, during a period of the brightness histogram operation.

According to a second aspect of the present invention, the invention is the image processing apparatus according to the first aspect, wherein the lookup-table memory includes: a plurality of address input ports for receiving plural numbers of the pixel data in parallel as the address data; a plurality of storage areas designated by each of the address data; a plurality of data output ports for outputting a plurality of the output values read out from each of the storage areas in parallel; and a plurality of data input ports for receiving data to be written into each of the storage areas in parallel, and wherein the incremental circuit executes an increment on the accumulation value obtained by combining bit series of the output values outputted from each of the data output ports, and then the incremental circuit resolves into the original bit series and outputs them to each of the data input ports.

According to a third aspect of the present invention, the invention is the image processing apparatus according to the second aspect, wherein when a bit length of the pixel data inputting to the lookup-table memory is represented by N (N: natural number), a bit length of the output value is represented by M (M: natural number), and the number of bit series of the output values to be combined is represented by L (L: natural number), the lookup-table memory stores the output value having $2^N/L$ levels for each of the pixel data, and the accumulation value is data of M times L bits.

According to a fourth aspect of the present invention, the invention is the image processing apparatus according to the second aspect, wherein the storage area of the lookup-table memory are separated into a plurality of regions in correspondence with pixel data inputted in parallel for each color component to the address input port.

According to a fifth aspect of the present invention, the image processing apparatus according to any one of first to fourth aspects, further comprises a simplified gamma correction circuit for executing the gamma correction process in a simplified manner during the period for executing the brightness histogram operation.

According to a sixth aspect of the present invention, an image processing system comprises: an image processing apparatus according to any one of first to fifth aspects, and a DMA controller for DMA (direct memory access)-transferring pixel data, wherein the DMA controller reads out pixel data, which is captured by an image pickup sensor having a single-chip type color filter array and is stored in a buffer, while designating an address for every same color component and transfers the same to the image processing apparatus.

As described above, according to the image processing apparatus according to the first aspect of the present invention, it is possible to use the lookup-table memory for gamma correction incorporated in the image processing apparatus as a memory area for storing the accumulation value calculated at the time of brightness histogram operation. Therefore, it is possible to realize an image processing apparatus of low power consumption, small size and low price capable of rapidly calculating the brightness histogram by hardware process without requiring provision of an integration circuit and a large-scale memory dedicated for the brightness histogram operation.

According to the second aspect of the present invention, it is possible to significantly expand the bit length of the above-mentioned accumulation value. Therefore, it is possible to perform the brightness histogram operation with extremely high accuracy.

According to the third aspect of the present invention, for example, when the above-mentioned lookup-table memory outputs four series of 8-bit length with respect to the input of four series of 12-bit length, by combining the bit series of the respective output values, it is possible to obtain an expanded accumulation space of 32 (8×4) bits.

According to the fourth aspect of the present invention, since the storage area of the lookup-table memory which performs gamma correction of plural color components can be used for the brightness histogram operation, it is possible to execute the brightness histogram operation with high accuracy.

According to the fifth aspect of the present invention, even if the lookup-table memory is occupied by the brightness histogram operation, it is possible to execute the brightness histogram operation and the image processing in parallel.

According to the image processing system according to the sixth aspect of the present invention, since the brightness histogram operation can be achieved for every same color component, it is possible to obtain a brightness histogram of high reliability.

In view of the above-mentioned problems, it is an object of the present invention to provide an image processing apparatus capable of executing a brightness histogram operation without requiring a special-purpose integration circuit and memory.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a functional block diagram showing an image processing apparatus according to a preferred embodiment of the present invention;

FIG. 2 is a functional block diagram showing the image processing apparatus and a peripheral circuit according to the preferred embodiment.

FIG. 4 is a schematic diagram showing data configuration of accumulation value calculated in a brightness histogram operation.

FIG. 5 is a schematic diagram showing a color component arrangement of raw image data.

DESCRIPTION OF THE PREFERRED EMBODIMENTS

Figure 3:
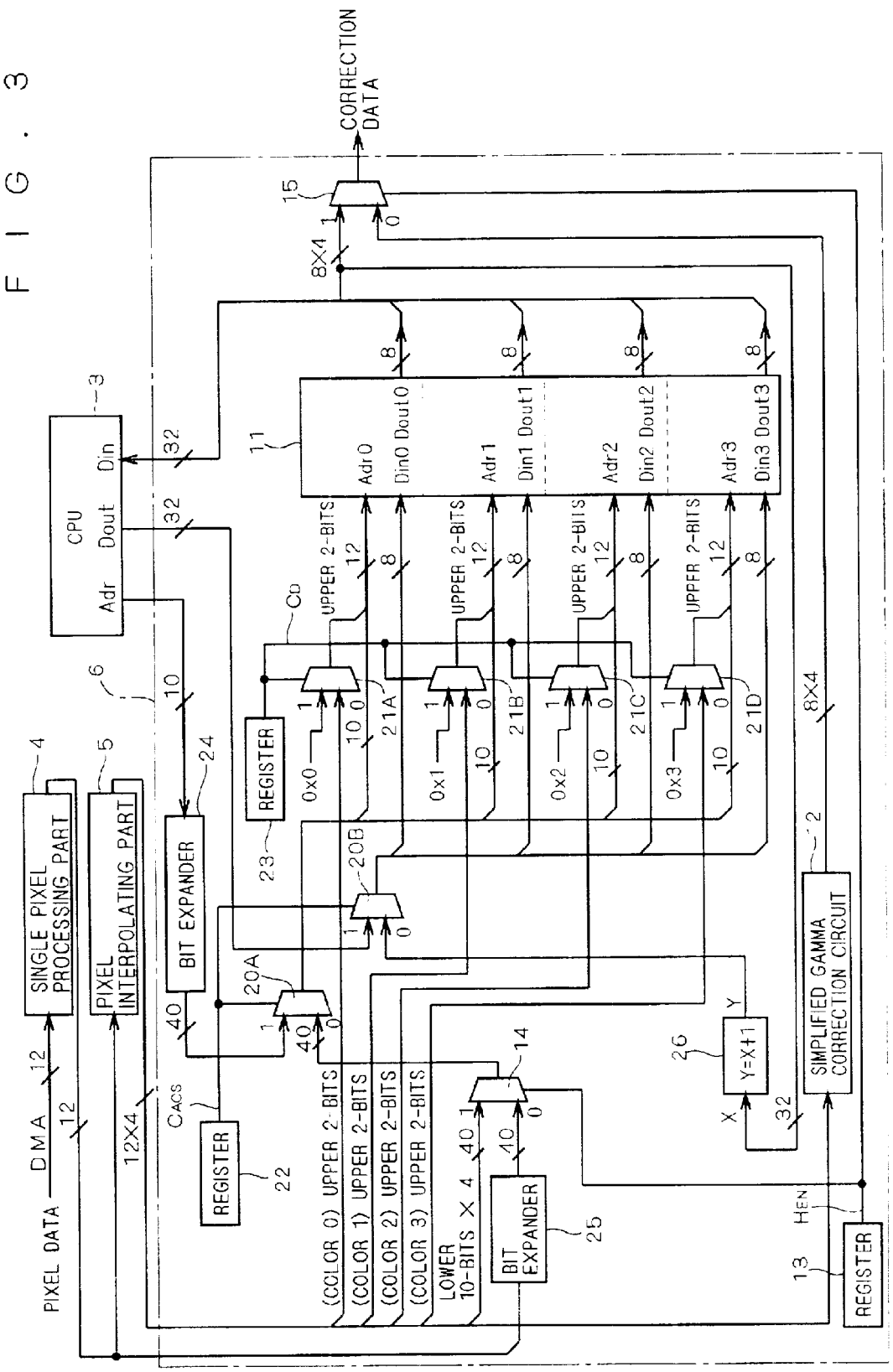
FIG. 3 is a circuit view showing a schematic configuration of a gamma correction processing part according to the preferred embodiment.

FIG. 1 is a functional block diagram showing an image processing apparatus 1 according to a preferred embodiment of the present invention. The image processing apparatus 1 is configured as an integrated circuit provided with a single pixel processing part 4, a pixel interpolating part 5, a gamma correction processing part 6, a color space conversion/color suppression processing part 7, a space filtering/coring processing part 8 and a resolution converting part 9, and incorporated in an image pickup device such as digital still camera.

FIG. 2 is a functional block diagram showing the image processing apparatus 1 and a peripheral circuit thereof in an image pickup device. The light having transmitted through an optical system such as lens system is outputted to an A/D converter 17 after being subjected to photoelectric conversion at an image pickup sensor 16 such as CCD or CMOS and subjected to an analogue signal process. The A/D converter 17 outputs raw image data resulting from A/D converting the analogue image signal inputted from the image pickup sensor 16 to a raw image data buffer 18a of a main memory 18 via a data bus (not shown). Next, the DMA (direct memory access) controller 27 sequentially reads out pixel data of the raw image data stored in the raw image data buffer 18a, and controls a data bus 2 shown in FIG. 1 to transfer and input it to the single pixel processing part 4. Each of processing blocks 4 to 9 performs image processing serially (sequentially) on the input pixel data and finally outputs to the data bus 2 from the resolution converting part 9. Under the control of a DMA controller 27, the processed data thus outputted is transferred to a process data buffer 18b of the main memory 18 and stored therein, and thereafter transferred to a display apparatus 19 such as an LCD (liquid crystal display) to be displayed thereon. As shown in FIG. 1, the single pixel processing part 4, the pixel interpolating part 5, the space filtering/coring processing part 8 and the resolution converting part 9 are separately connected with the data bus 2, so that they can perform image processing independently of each other. For example, such a process can be applicable that the pixel interpolating part 5 having received process data from the single pixel processing part 4 transmits the process data to the main memory 18 via the data bus 2 after effecting pixel interpolation on the process data without passing the process data to the gamma correction processing part 6.

The aforementioned single pixel processing part 4 has a function of processing inputted raw image data for a unit of single pixel, and performs a time-averaging process for averaging the raw image data over a plurality of frames or a plurality of fields and a shading process. For example, in the time-averaging process, when the amount of light exposure of a subject is not sufficient, a process of increasing the amount of exposure by accumulating the pixel data over a plurality of frames or over a plurality of fields which are read out at normal intervals from the image pickup sensor 16 is performed. Also, in the shading process is executed by adjusting the gain of brightness of each pixel so that the whole of the image is uniform in brightness on average. In the above description, "shading" means a mismatch in conversion characteristic which occurs between the original brightness distribution of the subject image and the image signal resulting from that the transmission light of the optical system reduces from the center to the periphery of the optical system and that the light requirement sensitivity of the image pickup sensor 16 is lack of uniformity.

Furthermore, the aforementioned pixel interpolating part 5 has a space register (not shown) for storing pixel data of a local area of about 5×5 pixels, and has a function of, for example, calculating an average value of the same color components by selectively picking up pixel data within the local area. For example, in the case where the aforementioned image pickup sensor 16 mounts thereon a color filter array of single chip type, image data outputted from the image pickup sensor 16 has only a single color component for each pixel, so that it is necessary to perform pixel interpolation for the lacking color components using surrounding pixels so that each pixel has three color components or four color components. As the three color components, three primary color components such as "R (red)", "G (green)" and "B (blue)", and as the four color components, complementary color components such as "Y (yellow)", "M (magenta)", "C (cyan)" and "G (green)" can be exemplified. The pixel interpolating part 5 can execute such a pixel interpolation process as described above.

Furthermore, the aforementioned gamma correction processing part 6 has a gamma correction function for correcting a gamma characteristic of input image data so as to conform with the human visual characteristic and internal image processing as shown in FIG. 1. For this purpose, the gamma correction processing part 6 is provided with a LUT operation circuit 10 having a memory 11 for look-up table (hereinafter, abbreviated as LUT memory) such as SRAM (Static Random Access Memory). The LUT memory 11 holds LUT conversion values corresponding to each brightness value of several thousands of tone, for example. The LUT operation circuit 10 outputs a brightness value of input pixel data (input value) to the LUT memory 11 as address data, and the LUT memory 11 selects (LUT converts) a LUT conversion value (output value) designated by the address data and outputs it. Since the stored data in the LUT memory 11 is rewritable by the control of the CPU 3, it is possible to freely set a LUT conversion value that realizes removal of noise occurring in a low brightness region, reversion of a certain tone and the like by emphasizing or reducing brightness values within a certain area.

Furthermore, the gamma correction processing part 6 is also provided with a simplified gamma correction circuit 12 which gamma-converts brightness value of imaged data in three to five levels in a simplified manner. Furthermore, the CPU 3 transmits a control signal $H_{EN}$ which makes a first selector 14 and a second selector 15 select either "0" terminal or "1" terminal, to a register 13 and allows the register 13 to store the same. When the level of the above control signal $H_{EN}$ transmitted from the register 13 is at L (low) level, the first selector 14 outputs pixel data input to the "0" terminal from the pixel interpolating part 5 to the LUT operation circuit 10, and the second selector 15 outputs gamma correction data input to the "0" terminal from the LUT operation circuit 10 to the color space conversion/color suppression processing part 7. On the other hand, when the level of the above control signal $H_{EN}$ transmitted from the register 13 is at H (high) level, the first selector 14 outputs pixel data input to the "0" terminal from the single pixel processing part 4 to the LUT operation circuit 10, and the second selector 15 outputs gamma correction data input to the "1" terminal from the simplified gamma correction circuit 12 to the color space conversion/color suppression processing part 7. In this case, the LUT operation circuit 10 functions as a circuit for performing brightness histogram operation as will be described later.

Furthermore, the above color space conversion/color suppression processing part 7 has a color space converting function for converting the color space from RGB signals of three primary colors to YCbCr signals (Y: luminance signal, Cb, Cr: color difference signal) for example, and a color suppressing function for performing color suppression (chroma suppress; false color prevention) of light part and dark part in the image. As the target color space for conversion in the color space conversion function, for example, the YIQ color space defined in the NTSC (National Television System Committee) system or the like may be employed other than the YCbCr color space. Furthermore, the color suppression function can realize a natural image quality by suppressing the coloring of a light part of high brightness and a dark part of the low brightness appearing in an image. In general, a dark part appearing in an image is a part that is easily influenced by various noises and a light part is a part that is easily influenced by modulation in accordance with characteristics of image pickup device and other various hardware and in which the white balance is easily deviated. Therefore, for both of the light part and the dark part, it is possible to obtain a natural image quality by suppressing the coloring.

The aforementioned space filtering/coring processing part 8 employs a space filter having 5×5 coefficient values corresponding to a local area of about 5×5 pixels, and has a space filtering function of executing a product-sum operation wherein each coefficient value of the space filter is weighted (multiplied) and added on corresponding pixel data, and a coring function of effecting a general nonlinear process (coring) on the image data having been subjected to the space filtering process. By the space filtering function and the coring function, it is possible to output only low frequency components, remove the noise components included in the image, emphasize line and edge portions (edge enhancement) and the like.

The aforementioned resolution converting part 9 has a function of reducing or enlarging the size of image data outputted from the above-described space filtering/coring processing part 8 based on the bilinear method (linear interpolation method) or the like.

In the following, an example of circuit configuration of the aforementioned gamma correction processing part 6 and an operation thereof will be described in detail. FIG. 3 is a circuit view showing a schematic configuration of the gamma correction processing part 6. This gamma correction processing part 6 receives processed data outputted from the above-described single pixel processing part 4 and the pixel interpolating part 5. The single pixel processing part 4 effects a process on pixel data of 12 bits DMA-transferred from the raw image data buffer 18a for every single pixel and outputs processed data of the same bit length, while the pixel interpolation part 5 outputs interpolation data of four components (Color0, Color1, Color2, Color3), namely, interpolation data having a total length of 48 (=4×12) bits which is obtained by effecting an image interpolation process on the pixel data inputted from the single pixel processing part 4. In the present embodiment, the A/D converter 17 A/D-converts the analogue image signal to raw image data of 10-bit tone and outputs the same. The raw image data to be stored in the raw image data buffer 18a is 12-bit data wherein upper two bits are added to the 10-bit data outputted from the A/D converter 17.

Furthermore, the LUT memory 11 outputs LUT conversion values of 8-bit length from data output ports (Dout0, Dout1, Dout2, Dout3) respectively for the address data of 12-bit length inputted to address input ports (Adr0, Adr1, Adr2, Adr3). For this purpose, the LUT memory 11 has a storage area of a total of 4096×8 bits. Furthermore, effective bits of the input 12-bit data are lower 10 bits, and the storage area is separated into four storage regions for each color component for the purpose of storing the LUT conversion values of 8-bit length of 1024 ($=2^{10}$) levels for the respective color components. Furthermore, the LUT memory 11 can write data inputted to data input ports (Din0, Din1, Din2, Din3) and rewrite the LUT conversion values in the storage area designated by the address data inputted to the address input ports (Adr0, Adr1, Adr2, Adr3).

The gamma correction processing part 6 as described above has a gamma correction function and a brightness histogram operation function. When the gamma correction processing part 6 is in a gamma correction mode, the CPU 3 transmits a control signal $H_{EN}$ of L level to the register 13 and makes the register 13 hold the control signal $H_{EN}$. The first selector 14 and the second selector 15 respectively select "0" terminals according to the control signal $H_{EN}$ transmitted from the register 13.

Furthermore, the CPU 3 controls so that the LUT conversion values for gamma correction are written into the LUT memory 11. That is, first, the CPU 3 transmits control signals $C_{ACS}$ and $C_D$ of High level respectively to registers 22 and 23 and make these registers hold the signals. As a consequence of this, selectors 20A and 20B respectively select "1" terminals according to the control signal $C_{ACS}$ transmitted from the register, while selectors 21A, 21B, 21C and 21D respectively select "1" terminals according to the data switching signal $C_D$ transmitted from the register 23. Then, the CPU 3 outputs address data of 10-bit length from the own output terminal (Adr), and a bit expander 24 expands the address data to four series of 10-bit data and outputs them to the LUT memory 11 via the selector 20A. The four series of address data outputted from the selector 20A are respectively combined with "0×0", "0×1", "0×2", "0×3" (0x: prefix for hexadecimal numeral) of upper two bits outputted from the selectors 21A, 21B, 21C and 21D, and are inputted to the respective address input ports (Adr0 to Adr3) in the form of data of 12-bit length. In connection with this, the values of "0×0" to "0×3" respectively designate the storage regions of LUT memory 11 corresponding to the respective color components. Furthermore, the CPU3 transmits four series of gamma corrections values of 8-bit length to the respective data input ports (Din0 to Din3) of the LUT memory 11 respectively via the selector 20B from the own output terminal (Dout) while supplying a WE (write enable) signal (not shown) to the LUT memory 11. Then, the LUT memory 11 writes the input gamma conversion values into the memory devices designated by the address data.

After completion of writing of the above gamma conversion values, the CPU 3 transmits the control signal $C_{ACS}$ of L level to the register 22 and makes the register 22 hold the signal. As a consequence of this, the selectors 20A and 20B respectively select the "0" terminals in accordance with the control signal $C_{ACS}$ transmitted to the register 22, and the selectors 21A to 21D select the "1" terminals in accordance with the control signal $C_D$ of H level transmitted from the register 23. After that, the pixel data DMA-transferred to the single pixel processing part 4 is sequentially processed, and input to the gamma correction processing part 6 in the form of four series of pixel data of 12-bit length for the respective color components (Color0 to Color 3). The four series of pixel data is separated into upper 2-bit data and lower 10-bit data for each color component, and the respective upper 2-bit data inputs to the "0" terminals of the selectors 21A to 21D. On the other hand, the four series of lower 10-bit data transmits via the first selector 14 and the selector 20A, and each of which is combined with the respective upper 2-bit data of "0×0", "0×1", "0×2" and "0×3" outputted from the selectors 21A to 21D, and input to the respective address input ports (Adr0 to Adr3) of the LUT memory 11 in the form of 12-bit data. In the condition of being supplied with the RE (read enable) signal, The LUT memory 11 selects a gamma conversion value (LUT conversion value) of 8-bit length while assigning a brightness value of each pixel data input from the respective address input ports to address data, and outputs from the respective data output ports (Dout0 to Dout3). The gamma conversion value (correction data) is output to the color space conversion/color suppression processing part 7 via the second selector 15.

As described above, in the present preferred embodiment, the A/D converter 17 outputs 10-bit data, and the effective bits of the 12-bit data input to the single pixel processing part 4 are lower 10 bits. In place of the above, when the above A/D converter 17 A/D-converts an analogue image signal to data of 12-bit tone and outputs the same, and the single pixel processing part 4 can process the data of 12-bit tone, it is possible to use the LUT memory 11 as a memory for storing LUT conversion values having 4096 ($=2^{12}$) levels. In such a case, the CPU 3 transmits the control signal $C_D$ to the register 23 and makes the register 23 hold the signal. As a consequence of this, the selectors 21A to 21D respectively select the "0" terminals. At this time, four series of pixel data of 12-bit length input to the gamma correction processing part 6 are separated for each color component into upper 2-bit data and lower 10-bit data, and the upper 2-bit data is input to the "0" terminals of the selectors 21A to 21D. On the other hand, the four series of lower 10-bit data are respectively combined with the upper 2-bit data outputted from the selectors 21A to 21D via the selectors 14 and 20A, and input to the LUT memory 11 in the forms of 12-bit data. Next, regardless of the color component, the LUT memory 11 outputs a gamma conversion value of 8-bit length with respect to the pixel data of 12-bit input. Therefore, the gamma correction processing part 6 according to the present preferred embodiment can handle both of the cases that the effective bits of the pixel data input from the pixel interpolating part 5 are 10 bits and 12 bits.

Furthermore, in the case where the A/D converter 17 A/D-converts an analogue image signal to data of 12-bit tone and outputs it, and the single pixel processing part 4 can process the 12-bit data, upper 10 bits of that 12-bit data may be the effective bits. In such a case, the above-mentioned pixel interpolating part 5 outputs upper 10-bit data of four series of pixel data of 12-bit length to the "1" terminal of the first selector 14. Furthermore, the pixel interpolating part 5 outputs lower 2-bit data of the same to the "0" terminals of the selectors 21A to 21D for the respective color components (Color0 to Color3). Then, the selectors 21A to 21D respectively select the "1" terminals under the control of the control signal $C_D$, and output the data of "0×0", "0×1", "0×2" and "0×3". The respective 2-bit data of "0×0", "0×1", "0×2" and "0×3" are combined with the respective 10-bit data transmitting via the first selector 14 and the selector 20A for the respective color components, and input to the respective address input ports (Adr0 to Adr3) of the LUT memory 11 in the form of 12-bit data. With the configuration as described above, the LUT memory 11 can output the LUT conversion values with respect to the upper 10-bit inputs of the four series of pixel data of 12-bit length outputted from the pixel interpolating part 5 from the respective data output ports (Dout0 to Dout3).

Next, in the mode wherein the gamma correction processing part 6 performs brightness histogram operation, the CPU 3 transmits the control signal $H_{EN}$ of high level to the register 13 and makes the register 13 hold the signal. As a consequence of this, the first selector 14 and the second selector 15 respectively select the "1" terminals in accordance with the control signal $H_{EN}$ transmitted from the register 13.

Furthermore, the LUT memory 11 is utilized as a storage area for an accumulation value of brightness histogram operation (number of times; frequency of each brightness value of image data). Therefore, first, the CPU 3 performs a control for writing an initial value (zero value) of the aforementioned accumulation value into the LUT memory 11. That is, the CPU 3 transmits the control signals $C_{ACS}$ and $C_D$ of high level respectively to the registers 22 and 23, and makes the registers 22 and 23 hold the signals. As a consequence of this, the selector 20A and the selector 20B respectively select the "1" terminals in accordance with the access control signal $C_{ACS}$ transmitted from the register 22, and the selectors 21A to 21D respectively select the "1" terminals in accordance with the data switching control signal $C_D$ transmitted from the register 23. Then, the CPU 3 outputs address data of 10-bit length from the output terminal (Adr), and the bit expander 24 expands the address data transmitted to four series of data of 10-bit length, and outputs them to the LUT memory 11 via the selector 20A. Next, the four series of address data outputted from the selectors are respectively combined with the values "0×0", "0×1", "0×2" and "0×3" of upper 2 bits outputted from the selectors 21A to 21D to become 12-bit data, and input to the respective address input ports (Adr0 to Adr3). Furthermore, in the condition of supplying the LUT memory 11 with the WE signal, the CPU 3 transmits four series of 8-bit initial values from the own output terminal (Dout) to the respective data input ports (Din0 to Din3) of the LUT memory 11 via the selector 20B. Then, the LUT memory 11 writes the input initial values (zero values) to the memory element designated by the respective address data.

After completion of the above-mentioned writing of the initial values, the CPU 3 transmits the control signal $C_{ACS}$ of L level to the register 22 and makes the register 22 hold the signal. As a consequence of this, the selectors 20A and 20B respectively select the "0" terminals. After that, the pixel data DMA-transferred to the single pixel processing part 4 is outputted to the bit expander 25 after being subjected to the process for every pixel. When the effective bits of the input 12-bit data are lower 10 bits, the bit width expender 25 expands the lower 10-bit data to four series of 10-bit data, and outputs them to the "0" terminal of the selector 20A via the first selector 14. Is to be noted that when the A/D converter 17 outputs data of 12-bit tone and hence the upper 10 bits of the 12-bit data are regarded as the effective bits as described above, the bit expander 25 outputs the upper 10 bits to four series of bit data and outputs them to the "0" terminal of the selector 20A via the first selector 14.

The respective four series of 10-bit data outputted from the selector 20A are combined with the values of upper 2-bit "0×0", "0×1", "0×2" and "0×3" outputted from the selectors 21A to 21D, respectively, to become 12-bit data, and input to the address input ports (Adr0 to Adr3) of the LUT memory 11. At this time, in the condition of being supplied with the RE signal from the CPU 3, the LUT memory 11 reads out conversion values of 8-bit length which are designated by the input four series of 12-bit data assigned to address data and those conversion values are outputted to an incremental circuit 26 from the data output ports (Dout0 to Dout3). The incremental circuit 26 handles data of 32-bit length obtained by combining the four input bit series of conversion values as an accumulation value, and increments the accumulation value by the value of "1". Then, the incremental circuit 26 resolves the accumulation value into the original bit series to output them to the selector 20B. The four series of 8-bit data outputted from the incremental circuit 26 are respectively transmitted to the respective data input ports (Adr0 to Adr3) of the LUT memory 11 via the selector 20B. At this time, the LUT memory 11 is supplied with the WE signal from the CPU 3, and rewrites the above conversion values with the respective 8-bit data input to the data input ports. It is to be noted that the above-mentioned RE signal and WE signal may be generated in a special-purpose timing generation circuit in place of the CPU 3.

FIG. 4 is a schematic diagram showing data configuration of an accumulation value 30 as described above. In FIG. 4, the reference numerals 30a, 30b, 30c and 30d respectively represent LUT conversion values of 8-bit length outputted from the respective data output ports (Dout0 to Dout3). Since the above incremental circuit 26 handles the data obtained by combining inputted four series of 8-bit data 30a to 30d as the accumulation value 30 of 32-bit length, the LUT memory 11 is utilized as an accumulation space of 32-bit length. That is, the LUT memory 11 has storage regions corresponding to each of the 4(=$2^2$) color components, and stores 1024 (=$2^{12}/4$) LUT conversion values of 8-bit length corresponding to 12-bit input in each storage region.

Furthermore, in the present preferred embodiment, the storage area of the LUT memory 11 is separated into four storage regions for the respective four color components, however, without limited to this, it is also possible that the whole of the storage area of the LUT memory 11 may be shared with all the color components. As described above, in the case where the above-mentioned A/D converter 17 outputs data of 12-bit tone, and the effective bits of the 12-bit data processed and outputted from the single pixel processing part 4 are 12 bits, the LUT memory 11 can output 4096 (=$2^{12}$) LUT conversion values of 8-bit length corresponding to the 12-bit inputs of the respective color components.

Now, assuming that the LUT memory outputs an LUT conversion value of M bit length (M: natural number) for N-bit input (N: natural number), and the number of separated storage regions of the LUT memory separated based on the number of color components is represented by L (L: natural number), the LUT memory can store conversion values having $2^N/L$ levels corresponding to the input bits of the respective color components, and can have an accumulation space of M×L bits.

As described above, by outputting pixel data in one frame or in a certain region in one frame to the gamma correction processing part 6 in the brightness histogram operation mode, it is possible to store accumulation values (number of times) of brightness values of the respective pixel data in the LUT memory 11. Therefore, it is no longer necessary to provide an integration circuit and a large-capacity memory specifically for brightness histogram operation as is the conventional art, resulting that reduction of power consumption, miniaturization of circuit configuration, and lower price of the apparatus can be realized.

In the case where the LUT memory 11 is a 2-port memory having two ports to which the RE signal and the WE signal are independently input, during one pixel clock period (reference clock period for processing one pixel data), reading-out of an accumulation value from the LUT memory 11 and storing of the value obtained by incrementing the accumulation value into the LUT memory 11 are executed in this one pixel clock period. On the other hand, in the case where the LUT memory 11 is a single port memory to which the RE signal and the WE signal are inputted to a common port, it is preferred that reading-out of the accumulation value is performed in a former half of one pixel clock period, and storing of the value obtained by incrementing of the read-out accumulation value into the LUT memory 11 is performed in a latter half of the one pixel clock period.

After completion of the above-described brightness histogram operation, the CPU 3 transmits the control signal $C_{ACS}$ of H level to the register 22 and makes there register 22 hold the signal. As a consequence of this, the selectors 20A and 20B select the "1" terminals in accordance with the control signal $C_{ACS}$ transmitted from the register 22. Next, the CPU 3 outputs address data to the address input ports (Adr0 to Adr3) in the manner as described above while supplying the LUT memory 11 with the RE signal, reads out accumulation values (histogram data) corresponding to the respective brightness values from the data output ports (Dout0 to Dout3) of the LUT memory 11 to take tem to the input terminal (Din) of the CPU 3. The CPU 3 can control fine adjustment of white balance by analyzing the image characteristic of the image data captured by the image pickup sensor 16 based on the taken histogram data.

While the above gamma correction processing part 6 executes the brightness histogram operation, the pixel data outputted from the pixel interpolating part 5 is transmitted to the simplified gamma correction circuit 12 where it is subjected to simplified gamma correction, and thereafter outputted to the color space conversion/color suppression processing part 7 via the second selector 15. As a consequence of this, brightness histogram operation and gamma correction process can be executed in parallel. For example, such a use manner is possible that while a subject is being displayed on the finder by means of the above-mentioned display apparatus 19 in an image pickup device such as digital still camera, the simplified gamma correction circuit 12 is allowed to operate in parallel with the brightness histogram operation, and at the time of an actual image capturing, the gamma correction processing part 6 is switched into the mode of gamma correction process.

Also, in the above-mentioned example of operation, since the above image pickup sensor 16 is provided with a single-chip color filter array, the pixel data input from the single pixel processing part 4 to the gamma correction processing part 6 just has a single color component for each pixel. As shown in FIG. 5, in the case where the raw image data 31 having single color components of "X1", "X2", "X3" and "X4" for each pixel is stored in the raw image data buffer 18a of the main memory 18 shown in FIG. 2, the DMA controller 27 can read out the pixel data while designating the address in a dot sequential manner as X1, X2, X1, X2, . . . , X3, X4, X3, X4, . . . , and transmit to the single pixel processing part 4. In such a case, the brightness histogram operation in the gamma correction processing part 6 is executed without discriminating between the color components. On the other hand, the DMA controller 27 may read out the pixel data while designating the address of the same color component in a selective manner as X1 X1, X1, . . . , a shown by the arrow in FIG. 5, and transfer to the single pixel processing part 4. In such a case, it is possible to perform the brightness histogram operation in the gamma correction processing part 6 for every same color component.

While the invention has been shown and described in detail, the foregoing description in all aspects illustrative and not restrictive. It is therefore understood that numerous other modifications and variations can be devised without departing from the scope of the invention.

What is claimed is:

1. An image processing apparatus for executing a brightness histogram operation and a gamma correction process for input image data, comprising:
   a lookup-table memory, for receiving pixel data of said image data as address data, and outputting storage data designated by said address data as a gamma conversion value corresponding to a brightness value of said pixel data, in a first operational mode;
   an incremental circuit for outputting to said lookup-table memory an accumulation value for said brightness histogram operation which is obtained by incrementing an output value from said lookup-table memory, whenever said pixel data is inputted to said lookup-table memory, in a second operational mode;
   a controller for executing said brightness histogram operation by rewriting said output value stored in a storage area of said lookup-table memory into said accumulation value, in said second operational mode; and
   a circuit for executing said gamma correction process in parallel with said brightness histogram operation without using said lookup-table memory, during a period when said brightness histogram operation uses said lookup-table memory in said second operational mode.

2. The image processing apparatus according to claim 1, wherein
   said lookup-table memory includes:
   a plurality of address input ports configured to receive plural numbers of said pixel data in parallel as said address data;
   a plurality of storage areas designated by each of said address data;
   a plurality of data output ports configured to output a plurality of said output values read out from each of said storage areas in parallel; and
   a plurality of data input ports configured to receive data to be written into each of said storage areas in parallel, and wherein
   said incremental circuit executes an increment on said accumulation value obtained by combining bit series of said output values outputted from each of said data output ports, and then said incremental circuit resolves into said original bit series and outputs said original bit series to each of said data input ports.

3. The image processing apparatus according to claim 2, wherein when a bit length of said pixel data inputted to said lookup-table memory is represented by N (N: natural number), a bit length of said output value is represented by M (M: natural number), and the number of bit series of said output values to be combined is represented by L (L: natural number), said lookup-table memory stores said output value having $2^N/L$ levels for each of said pixel data, and said accumulation value is data of M times L bits.

4. The image processing apparatus according to claim 2, wherein said storage area of said lookup-table memory is separated into a plurality of regions in correspondence with pixel data inputted in parallel for each color component to said address input port.

5. The image processing apparatus according to claim 1, further comprising a simplified gamma correction circuit configured to execute said gamma correction process in a simplified manner during the period for executing said brightness histogram operation.

6. An image processing system comprising:
   an image processing apparatus according to claim 1, and
   a DMA controller for DMA (direct memory access)-transferring pixel data,
   wherein said DMA controller reads out pixel data, which is captured by an image pickup sensor having a single-chip type color filter array and is stored in a buffer, while designating an address for every same color component and transfers said pixel data to said image processing apparatus.

7. An image processing apparatus according to claim 1, wherein a single chip-type color filter is used for a generation of said image data and said gamma correction can be performed without discriminating color components.

8. An image processing system comprising:
   an image processing apparatus according to claim 1, and
   a DMA controller for DMA (direct memory access)-transferring pixel data,
   wherein said DMA controller reads out pixel data, which is captured by an image pickup sensor having a single-chip type color filter array and is stored in a buffer, and transfers said pixel data to said image processing apparatus.

9. The image processing apparatus according to claim 1, wherein an output value of said gamma correction process executed in parallel with said brightness histogram operation is utilized in said second operational mode, so that said image processing apparatus outputs to a display apparatus said sequentially input image data as a moving image even in said second operational mode.

10. An image processing apparatus for executing a brightness histogram operation and a gamma correction process for input image data, comprising:

a lookup-table memory, configured to receive pixel data of said image data as address data, and configured to output storage data designated by said address data as a gamma conversion value corresponding to a brightness value of said pixel data, during a period of said gamma correction process;

an incremental circuit configured to output to said lookup-table memory an accumulation value which is obtained by incrementing an output value from said lookup-table memory, whenever said pixel data is inputted to said lookup-table memory, during a period of said brightness histogram operation; and a controller configured to rewrite said output value stored in a storage area of said lookup-table memory by said accumulation value, during a period of said brightness histogram operation;

wherein said lookup-table memory includes:
 a plurality of address input ports configured to receive plural numbers of said pixel data in parallel as said address data;
 a plurality of storage areas designated by each of said address data;
 a plurality of data output ports configured to output a plurality of said output values read out from each of said storage areas in parallel; and
 a plurality of data input ports configured to receive data to be written into each of said storage areas in parallel; and wherein said incremental circuit executes an increment on said accumulation value obtained by combining bit series of said output values outputted from each of said data output ports, and then said incremental circuit resolves into said original bit series and outputs said original bit series to each of said data input ports;

wherein when a bit length of said pixel data inputted to said lookup-table memory is represented by N (N: natural number), a bit length of said output value is represented by M (M: natural number), and the number of bit series of said output values to be combined is represented by L (L: natural number), said lookup-table memory stores said output value having $2^N/L$ levels for each of said pixel data, and said accumulation value is data of M times L bits.

11. The image processing apparatus according to claim 10, wherein said storage area of said lookup-table memory is separated into a plurality of regions in correspondence with pixel data inputted in parallel for each color component to said address input port.

12. The image processing apparatus according to claim 10, further comprising a simplified gamma correction circuit configured to execute said gamma correction process in a simplified manner during the period for executing said brightness histogram operation.

13. An image processing system comprising:
 an image processing apparatus according to claim 10, and
 a DMA controller for DMA (direct memory access)-transferring pixel data,
 wherein said DMA controller reads out pixel data, which is captured by an image pickup sensor having a single-chip type color filter array and is stored in a buffer, while designating an address for every same color component and transfers said pixel data to said image processing apparatus.

14. An image processing apparatus for executing a brightness histogram operation and a gamma correction process for input image data, comprising:

a lookup-table memory, configured to receive pixel data of said image data as address data, and configured to output storage data designated by said address data as a gamma conversion value corresponding to a brightness value of said pixel data, during a period of said gamma correction process;

an incremental circuit configured to output to said lookup-table memory an accumulation value which is obtained by incrementing an output value from said lookup-table memory, whenever said pixel data is inputted to said lookup-table memory, during a period of said brightness histogram operation; and a controller configured to rewrite said output value stored in a storage area of said lookup-table memory by said accumulation value, during a period of said brightness histogram operation;

wherein said lookup-table memory includes:
 a plurality of address input ports configured to receive plural numbers of said pixel data in parallel as said address data, wherein said address input ports are connected partially to a common address bus;
 a plurality of storage areas designated by each of said address data;
 a plurality of data output ports configured to output a plurality of said output values read out from each of said storage areas in parallel; and
 a plurality of data input ports configured to receive data to be written into each of said storage areas in parallel.

15. An image processing apparatus according to claim 14, wherein the address data inputted to the look-up memory and not shared in said common address bus is generated by using color component of said pixel data or by using a fixed address value.

16. An image processing system comprising:
 an image processing apparatus according to claim 14, and
 a DMA controller for DMA (direct memory access)-transferring pixel data,
 wherein said DMA controller reads out pixel data, which is captured by an image pickup sensor having a single-chip type color filter array and is stored in a buffer, and transfers said pixel data to said image processing apparatus.

* * * * *